United States Patent Office 3,551,423
Patented Dec. 29, 1970

3,551,423
PRODUCTION OF AMIDES SUBSTITUTED ON THE NITROGEN ATOM
Harro Petersen, Frankenthal, Pfalz, Germany, assignor to Badische Anilin- & Soda-Fabrik Aktiengesellschaft, Ludwigshafen (Rhine), Germany
No Drawing. Filed Aug. 18, 1967, Ser. No. 661,515
The portion of the term of the patent subsequent to Nov. 3, 1987, has been disclaimed
Int. Cl. C07d 51/18
U.S. Cl. 260—251                            9 Claims

ABSTRACT OF THE DISCLOSURE

Production of amides bearing an aliphatic radical having an aldehyde group in $\beta$-position as a substituent on the nitrogen atom, by reaction of appropriate amides with formaldehyde and an appropriate CH-acid aldehyde in one or two steps and also the new amides bearing as a substituent on the nitrogen atom an aliphatic radical having an aldehyde group in $\beta$-position. The new products are textile finishes and valuable intermediates for the production of amino aldehydes and aminocarboxylic acids, pharmaceuticals and aminoplasts.

---

This invention relates to the production of amides bearing as a substituent on the nitrogen atom an aliphatic radical having an aldehyde group in $\beta$-position, by reaction of appropriate amides with formaldehyde and an appropriate CH-acid aldehyde. CH-acid aldehydes are defined as aldehydes which bear at least one hydrogen atom in $\alpha$-position to the aldehyde group.

It is an object of this invention to provide a new method for the production in good yields of amides bearing as a substituent on the nitrogen atom an aliphatic radical having an aldehyde group in $\beta$-position from easily accessible starting materials.

A further object of this invention is to provide new amides bearing as substituent on the nitrogen atom an aliphatic radical which has an aldehyde group in $\beta$-position.

In accordance with this invention, these and other objects are achieved and amides bearing as substituent on the nitrogen atom an aliphatic radical which has an aldehyde group in $\beta$-position are obtained by reacting amides which bear at least one hydrogen atom on the nitrogen atom with formaldehyde and a CH-acid aldehyde in the temperature range of from 0° to 120° C in the presence of a strong acid which is not oxidized under the reaction conditions, in the presence or absence of an inert solvent and/or diluent, an approximately stoichometric amount of formaldehyde and an approximately stoichiometric amount of the CH-acid aldehyde being used for each hydrogen atom on the nitrogen atom of the starting amide which is to be reacted.

The process may be represented, for example for the reaction of N,N,N'-trimethylurea with formaldehyde and isobutyraldehyde, by the following equation:

$$\underset{\underset{H_3C}{|}}{\overset{\overset{H_3C}{|}\;\;O\;\;\overset{CH_3}{|}}{N-C-N}}\;\;+\;CH_2O\;+\;H\overset{\overset{H_3C}{|}}{\underset{\underset{H_3C}{|}}{C}}-CHO\;\longrightarrow\;\underset{\underset{H_3C}{|}}{\overset{\overset{H_3C}{|}\;\;O\;\;\overset{CH_3}{|}}{N-C-N}}\underset{\underset{\underset{CHO}{|}}{\overset{|}{C-CH_3}}}{\overset{|}{CH_2}}\;+\;H_2O$$

In principle the process may be carried out with all amides which have at least one hydrogen atom on the amide nitrogen atom and which do not contain any substituents which would enter into undesired secondary reactions with the aldehyde.

For the purposes of the present invention, amides are defined as substances containing the grouping $$-\overset{\overset{X}{\|}}{C}-\overset{\overset{H}{|}}{N}-$$

once or more than once. This group may also be a member of a ring system. Lactams and cyclic urethanes are therefore included among amides.

The preferred starting substances may be represented by the formula $$Z-\overset{\overset{X}{\|}}{C}-\overset{\overset{H}{|}}{N}-R^1$$

In the formula the radical Z denotes an alkyl radical having preferably one to eight carbon atoms, an aryl radical preferably having six to ten carbon atoms, an aralkyl radical preferably having seven to twelve carbon atoms or a cycloalkyl radical preferably having five to six carbon atoms; the radical Z may moreover denote the secondary amino group $$-\overset{|}{\underset{R^6}{N}}-R^5$$

in which $R^5$ and $R^6$ may be identical or different and preferably denote alkyl groups having one to eight carbon atoms or phenyl radicals; finally Z may denote the radical —$OR^7$ in which $R^7$ denotes an alkyl group preferably having one to four carbon atoms, a cycloalkyl group preferably having five to six carbon atoms, a hydroxyalkyl group preferably having two to three carbon atoms or an alkoxyalkyl group preferably having three to six carbon atoms. The radical X denotes sulfur or preferably oxygen. In the amides which are preferred as starting materials, $R^1$ in the formula denotes a hydrogen atom, an alkyl radical having one to four carbon atoms, an aryl radical having six to ten carbon atoms, an aralkyl radical having seven to twelve carbon atoms or a cycloalkyl radical having five to eight carbon atoms; $R^1$ may also denote the radical $$-CH_2-\overset{\overset{R^3}{|}}{\underset{R^4}{C}}-CHO$$

in which $R^3$ and $R^4$ may be identical or different alkyl radicals preferably having one to four carbon atoms; $R^1$ may also form with $R^5$ (when Z denotes the secondary amino group $$-\overset{|}{\underset{R^6}{N}}-R^5$$

an alkylene chain having two to three methylene groups in which up to three hydrogen atoms of the methylene groups may be replaced by alkyl groups having one to four carbon atoms. When $R^1$ and $R^5$ are together members of the said alkylene chain, $R^6$ may also denote a hydrogen atom or the radical $$-CH_2-\overset{\overset{R^3}{|}}{\underset{R^4}{C}}-CHO$$

in which $R^3$ and $R^4$ have the above meanings. The radicals $R^1$ and Z (when Z denotes an alkyl group), and $R^1$ and $R^7$ (when Z denotes the radical —$OR^7$) may together form an alkylene chain having three to five methylene groups.

The following are examples of amides which may be used as starting substances: acetamide, N-methylbutyramide, benzamide, N-propyltoluylamide, cyclohexane carboxylic amide, N,N-dimethylurea, 2-oxohexahydropyrimidine, 5,5-dimethyl-2-oxoheexahydropyrimidine, 1,5,5-trimethyl-2-oxohexahydropyrimidine, 5,5-dimethyl-6-isopropyl-2-oxzhexahydropyrimidine, N-methyl - 2 - oxahexahydropyrimidine, imidabolidinone, 4-methylimidabolidinone, N-methylimidazolidinone, methyl N-ethyl carbamate, 1-oxa-3-azacyclohexanone-(2), methoxyethylurethane, pyrrolidone and epsilon-caprolactam.

Aldehydes having the general formula

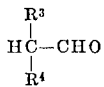

may be used as CH-acid aldehydes. In this formula, the radicals $R^3$ and $R^4$ in the aldehydes which it is preferred to use as starting substances denote identical or different alkyl groups, preferably having one to four carbon atoms. It is preferred to use the mono-CH-acid aldehydes, such as isobutyraldehyde and 2-ethylhexanal.

Examples of strong acids which do not oxidize under the reaction conditions are: hydrogen chloride, hydrogen bromide, concentrated hydrochloric acid, sulfuric acid, oxalic acid and benzenesulfonic acid. It is advantageous to carry out the process in the presence of solvents or diluents, as for example water; ethers, such as dioxane or tetrahydrofuran; or alkanols preferably having one to four carbon atoms.

The substances are in general reacted in the theoretical molar ratio. Slight deviations from this molar ratio, for example up to 10 mole percent, are possible. It is advantageous to carry out the reaction at from 0° to 120° C. preferably at from 40° to 100° C.

The process according to this invention involves a condensation reaction which can be accelerated by adding more acid, if desired while increasing the reaction temperature. In many cases the amide aldehydes can be obtained in the lower temperature range in the presence of large amounts of acid. On the other hand it is possible to carry out the reaction at high temperatures in the presence of less acid. The choice of temperature depends on the reactants and may be lowered by adding more acid, and vice versa.

The process may be carried out in various ways. Thus the starting materials may be introduced at the same time into the reactor, or the starting amide and formaldehyde may be introduced followed by the CH-acid aldehyde, or the starting amide and the CH-acid aldehyde may be introduced followed by the formaldehyde. The intermediates which form when the aldehydes are added separately are amides alkylolated on the nitrogen atom, the alkylol groups being etherified when an alkanol is used as solvent. When ureas are used as starting amides, alkylidene-bis-ureas and poly-α-alkylideneureas are formed. When using thioureas, thiourea derivatives are formed. Examples of some of these urea derivatives are: N-methylol-N',N' - dimethylurea, N - methyl-N'-methylolpropyleneurea, N,N'-dimethylolpropyleneurea, N,N' - dimethylol-4-methylpropyleneurea, N,N'-dimethylol-5,5-dimethylpropyleneurea, N-methoxymethyl-N',N'-dimethylurea or N,N'-dimethoxymethylpropyleneurea, the methylene-bis compounds of asymmetric dimethylurea, the methylene-bis compounds of cyclic ethyleneureas and propyleneureas, polymethyleneureas of cyclic ethyleneureas and propyleneureas and the corresponding thioureas.

The new compounds which can be prepared by this method are textile finishing agents and valuable intermediates, for example for the production of monobasic and polybasic aminoaldehydes, aminocarboxylic acids and aminoplasts. Cotton cloth may be impregnated with the new compounds, for example in an amount of 80 to 200 g. per kg. of fibrous material, from aqueous suspension, dried and treated at elevated temperature, for example 120° to 160° C., in a condensation unit and thus given a crease-resist finish.

They may be represented by the following general formula

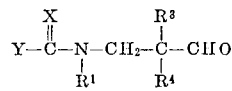

in which $R^1$, $R^3$, $R^4$ and X have the above meanings and Y denotes an alkyl radical, aryl radical, aralkyl radical, cycloalkyl radical, the secondary amino group

(in which $R^5$ and $R^6$ denote alkyl groups or phenyl groups) and the radical —$OR^7$ in which $R^7$ denotes an alkyl group, cycloalkyl group, hydroxyalkyl group or alkoxyalkyl group. The radicals R and Y, the radicals $R^1$ and $R^5$ or the radicals $R^1$ and $R^7$ may together form an alkylene chain having three to five methylene groups.

The invention is illustrated by the following Examples in which the parts mentioned are parts by weight.

EXAMPLE 1

342 parts of N-methyl - 2 - oxohexahydropyrimidine is mixed with 300 parts of 30% aqueous formaldehyde and 237 parts of isobutyraldehyde and, after adding 45 parts of concentrated hydrochloric acid, heated at refluxing temperature for three hours in a stirred apparatus having a reflux condenser. The reaction mixtue initially boils at about 60° C. In the course of half an hour the refluxing temperature rises to 90° to 95° C. After cooling, the product is neutralized with caustic soda solution and the reaction product is extracted by being shaken with chloroform. The chloroform solution is evaporated at subatmospheric pressure, 560 parts of a liquid crude product being obtained. This is a yield of 94% of the theory. The N-methyl-2-oxohexahydropyrimidyl-N'-neopental is purified by distillation in a high vacuum. Boiling point: 148° to 152° C. (2 mm.).

Analysis.—Calc'd for $C_{10}H_{18}O_2N_2$ (198) (percent): C, 60.3; H, 9.1; O, 16.2; N, 14.15. Found (percent): C, 60.3; H, 9.3; O, 16.2; N, 14.2.

EXAMPLE 2

A mixture of 264 parts of asymmetric dimethylurea, 300 parts of 30% formaldehyde solution and 237 parts of isobutyraldehyde has 45 parts of concentrated hydrochloric acid added to it and is then heated at refluxing temperature for two hours, the refluxing temperature rising in the first hour from about 60° C. to about 90° C. The whole is then neutralized with caustic soda solution and the reaction product is extracted with chloroform, the coloroform phase separated and the chloroform evaporated. 490 parts of N,N-dimethylureido-N'-neopental is obtained as a crude product. This is a yield of 95% of the theory. The product may be purified by distillation in a high vacuum. The product has a boiling range of from 127° to 132° C. (0.2 mm.).

Analysis.—Calc'd for $C_8H_{16}O_2N_2$ (172) (percent): C, 55.8; H, 9.3; O, 18.6; N, 16.3. Found (percent): C, 56.3; H, 9.6; O, 18.2; N, 15.8.

EXAMPLE 3

A mixture of 600 parts of 2-oxohexahydropyrimidine, 1,200 parts of 30% aqueous formaldehyde solution and 900 parts of isobutyraldehyde is placed in a stirred apparatus having a reflux condenser, 150 parts of 50% sulfuric acid is added and the whole is heated to refluxing temperature for three hours The refluxing temperature rises from about 60° C. to about 95° C. in the first half hour. The reaction solution is neutralized with caustic soda solution, the reaction product is extracted with chloroform and the chloroform is evaporated. 1,580 parts of 2-oxohexapyrimidyl-N,N'-dineopental (98% of the theory) is obtained as a crystalline crude product. Purification can be carried out by distillation in a high vacuum. The product boils at from 190° to 193° C. (0.5 mm.).

*Analysis.*—Calc'd for $C_{14}H_{24}O_3N_2$ (268) (percent): C, 62.6; H, 8.95; O, 17.9; N, 10.45. Found (percent): C, 62.9; H, 9.0; O, 17.8; N, 10.5.

EXAMPLE 4

950 parts of isobutyraldehyde and 150 parts of concentrated hydrochloric acid are added to 1,920 parts of a 50% aqueous solution of N,N'-dimethylol-2-oxohexahydropyrimidine (which has been obtained by reaction of 600 parts of 2-oxohexahydropyrimidine with 1,200 parts of 30% aqueous formaldehyde solution in the presence of 50 parts of 2-normal caustic soda solution) in a stirred apparatus fitted with a reflux condenser and the whole is heated at 95° C. (refluxing temperature) for ninety minutes. The reaction mixture initially has a refluxing temperature of about 60° C. but this rises in the course of half an hour to 95° C. After neutralization with caustic soda solution, the reaction product is worked up as described in Example 1. 1,500 parts of 2-oxohexahydropyrimidyl-N,N'-dineopental is obtained as a crystalline crude product. Purification may be carried out by distillation in a high vacuum. The infrared spectrum agrees with the product prepared according to Example 3.

*Analysis.*—Calc'd for $C_{14}H_{24}O_3N_2$ (268) (percent): C, 62.6; H, 8.95; O, 17.9; N, 10.4. Found (percent): C, 62.9; H, 9.0; O, 17.7; N, 10.2.

EXAMPLE 5

50 parts of concentrated hydrochloric acid is added in a stirred apparatus fitted with a reflux condenser to a mixture of 522 parts of N,N'-dimethoxymethylimidazolidinone-2, 442 parts of isobutyraldehyde and 300 parts of water and heated to refluxing temperature for two and a half hours. The reaction mixture is neutralized with caustic soda solution and the imidazolidinoyl-N,N'-dineopental is separated from the reaction mixture by extraction with chloroform. The chloroform is then evaporated. 738 parts of a crystalline crude product is obtained. This is a yield of 97% of the theory. The product is purified by distillation in a high vacuum. The boiling point is 177° to 180° C. (2.5 mm.).

*Analysis.*—Calc'd for $C_{13}H_{22}O_3N_2$ (254) (percent): C, 61.4; H, 8.65; O, 18.9; N, 11.0. Found (percent): C, 61.2; H, 8.6; O, 18.7; N, 11.1.

EXAMPLE 6

A mixture of 256 parts of 2-oxo-5,5-dimethylhexahydropyrimidine, 400 parts of 30% aqueous formaldehyde and 288 parts of isobutyraldehyde is mixed with 50 parts of concentrated hydrochloric acid and the whole heated for two hours at refluxing temperature in a stirred apparatus fitted with a reflux condenser. The whole is then neutralized with caustic soda solution, the product is separated by extraction with chloroform and the chloroform is evaporated. 580 parts of 2-oxo-5,5-dimethylhexahydropyrimidyl-N,N'-dineopental is obtained as a crystalline crude product (98% of theory). Purification is effected by distillation in a high vacuum. The boiling point is 166° to 170° C. (0.5 mm.).

*Analysis.*—Calc'd for $C_{16}H_{28}O_3N_2$ (296) (percent): C, 64.9; H, 9.45; O, 16.2; N, 9.45. Found (percent): C, 64.7; H, 9.7; O, 15.9; N, 9.4.

EXAMPLE 7

50 parts of concentrated hydrochloric acid is added to a mixture of 340 parts of pyrrolidone, 400 parts of 30% formaldehyde solution and 317 parts of isobutyraldehyde in a stirred apparatus fitted with a reflux condenser, the temperature rising to about 65° C. The reaction mixture is heated for six hours at refluxing temperature which during the first hours rises from 70° C. to about 89 to 90° C. The product is neutralized with dilute caustic soda solution and shaken with chloroform, the chloroform solution is dried with sodium sulfate and the solution is evaporated in a water jet vacuum. 544 parts of a syrupy product is obtained which is fractionally distilled in a high vacuum. 120 parts of pyrrolidoneneoptental is obtained in the boiling point range of 122° to 142° C. (1 mm.).

*Analysis.*—Calc'd for $C_9H_{15}O_2N$ (169) (percent): C, 63.8; H, 8.88; N, 8.28. Found (percent): C, 63.5; H, 9.00; N, 7.90.

EXAMPLE 8

845 parts of 2-ethylhexanal and 75 parts of concentrated hydrochloric acid are added to 960 parts of a 50% aqueous solution of N,N'-dimethylolpropyleneurea in a stirred apparatus. The reaction mixture is heated for five hours at 95° to 100° C. with continuous stirring, cooled and neutralized with dilute caustic soda solution. Two phases form. The upper phase begins to crystallize after it has stood for a short time. 1,080 parts of crude product is obtained after filtering and drying. This is a yield of 95% of the theory. Purification can be effected by a fractional distillation in a high vacuum. Boiling point (0.5 mm.) 240° to 243° C.

*Analysis.*—Calc'd for $C_{22}H_{40}O_3N_2$ (380) (percent): C, 69.5; H, 10.5; C, 12.6; N, 7.75. Found (percent): C, 69.2; H, 10.6; C, 12.9; N, 7.80.

I claim:

1. An amide of the formula

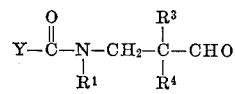

wherein $R^1$ is hydrogen, alkyl of 1 to 4 carbon atoms, or the radical

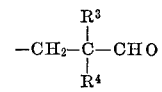

in which $R^3$ and $R^4$ denote identical or different alkyl radicals of 1 to 4 carbon atoms, Y is alkyl of 1 to 8 carbon atoms, the amino group:

in which $R^5$ and $R^6$ are alkyl groups of 1 to 8 carbon atoms or the radical —$OR^7$ in which $R^7$ is alkyl of 1 to 4 carbon aooms, hydroxyalkyl of 2 to 3 carbon atoms or alkoxyalkyl of 3 to 6 carbon atoms, wherein $R^1$ may also form with $R^5$ an alkylene chain of 2 to 3 methylene groups in which up to 3 hydrogen atoms of the methylene groups may be replaced by alkyl of 1 to 4 carbon atoms and when $R^1$ and $R^5$ are members of the said alkylene chain, $R^6$ may denote hydrogen or the radical

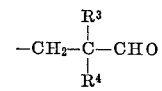

in which $R^3$ and $R^4$ have the above meanings and the radicals $R^1$ and Y or the radicals $R^1$ and $R^7$ may together form an alkylene chain of 3 to 5 methylene groups.

2. A process for preparing amides of the formula

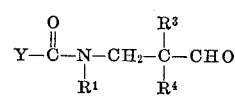

wherein $R^1$ is hydrogen, alkyl of 1 to 4 carbon atoms or the radical

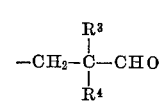

in which $R^3$ and $R^4$ denote identical or different alkyl radicals of 1 to 4 carbon atoms, Y is alkyl of 1 to 8 carbon atoms, the amino group:

in which $R^5$ and $R^6$ are alkyl groups having 1 to 8 carbon atoms or the radical $—OR^7$ in which $R^7$ is alkyl of 1 to 4 carbon atoms, hydroxyalkyl of 2 to 3 carbon atoms or alkoxyalkyl of 3 to 6 carbon atoms, wherein $R^1$ may also form with $R^5$ an alkylene chain of 2 to 3 methylene groups in which up to 3 hydrogen atoms of the methylene groups may be replaced by alkyl groups having 1 to 4 carbon atoms, and when $R^1$ and $R^5$ are members of the said alkylene chain, $R^6$ may denote hydrogen or the radical

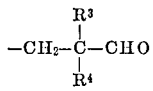

in which $R^3$ and $R^4$ have the above meanings and the radicals $R^1$ and Y or the radicals $R^1$ and $R^7$ may together form an alkylene chain of 3 to 5 methylene groups which comprises: reacting an amide of the formula

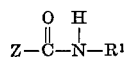

wherein Z is alkyl of 1 to 8 carbon atoms, the amino group

in which $R^5$ and $R^6$ may be identical or different and denote alkyl groups of 1 to 8 carbon atoms or the radical $—OR^7$ in which $R^7$ is alkyl of 1 to 4 carbon atoms, hydroxyalkyl of 2 to 3 carbon atoms or alkoxyalkyl of 3 to 6 carbon atoms, $R^1$ is hydrogen, alkyl of 1 to 4 carbon atoms or the radical

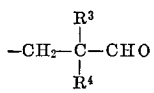

in which $R^3$ and $R^4$ may be identical or different alkyls of 1 to 4 carbon atoms, wherein $R^1$ may also form with $R^5$ an alkylene chain having 2 to 3 methylene groups in which up to 3 hydrogen atoms of the methylene groups may be replaced by alkyl groups having 1 to 4 carbon atoms, and wherein when $R^1$ and $R^5$ are members of the said alkylene chain, $R^6$ may also denote a hydrogen atom or the radical

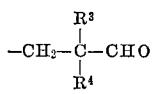

in which $R^3$ and $R^4$ have the above meanings and the radicals $R^1$ and Z (when Z denotes an alkyl group) or $R^1$ and $R^7$ (when Z denotes the radical $—OR^7$) may together form an alkylene chain having 3 to 5 methylene groups, with formaldehyde and a CH-acid aldehyde in the temperature range of from 0° to 120° C. in the presence of a strong acid which does not oxidize under the reaction conditions, about the stoichiometric amount of formaldehyde and about the stoichiometric amount of the CH-acid aldehyde being used for every hydrogen atom on the nitrogen atom of the starting amide to be reacted.

3. A process for preparing amides as claimed in claim 2 which comprises reacting the starting amide with formaldehyde in a first stage and reacting the intermediate product thus formed with the CH-acid aldehyde in a second stage.

4. A process for preparing amides as claimed in claim 2 which comprises reacting the starting amide with formaldehyde in a first stage at a pH value of from 7 to 10 by a conventional method and reacting the resultant intermediate produce with the CH-acid aldehyde in the presence of acid.

5. A process for preparing amides as claimed in claim 2 which comprises reacting the starting amide with the CH-acid aldehyde in a first stage and reacting the resultant intermediate product with formaldehyde in a second stage.

6. A process for preparing amides as claimed in claim 2 which comprises reacting the starting amide with the CH-acid aldehyde in a first stage at a pH value of from 7 to 10 in a conventional manner and reacting the resultant intermediate product with formaldehyde in the presence of acid.

7. A process as claimed in claim 2 wherein the reaction is carried out at from 40° to 100° C.

8. A process as claimed in claim 3 wherein the intermediate product formed in the first stage is isolated and then used in the second stage.

9. A process as in claim 2 wherein said process is carried out in the presence of an inert solvent selected from the group consisting of water, dioxane, tetrahydrofuran, and alkanols of 1 to 4 carbon atoms.

References Cited

UNITED STATES PATENTS

| 2,629,661 | 2/1953 | Mackey | 95—88 |
| 2,957,028 | 10/1960 | Brannock | 260—601 |
| 3,335,187 | 8/1967 | Hargis et al. | 260—601 |

FOREIGN PATENTS

| 655,066 | 1/1963 | Canada | 260—251 |

OTHER REFERENCES

Blicke: Organic Reactions, vol. I, Wiley Press, 1942, pp. 306, 327, 332.

ALEX MAZEL, Primary Examiner

R. V. RUSH, Assistant Examiner

U.S. Cl. X.R.

252—8.8; 260—309.7, 326.5, 553, 561

UNITED STATES PATENT OFFICE
CERTIFICATE OF CORRECTION

Patent No. 3,551,423          Dated December 29, 1970

Inventor(s) Harro Petersen

It is certified that error appears in the above-identified patent and that said Letters Patent are hereby corrected as shown below:

Column 1, line 8, in the heading, insert -- Claims priority application Germany, August 23, 1966, 1,670,133 --. Column 1, line 65, the right-hand side of the equation should appear as shown below:

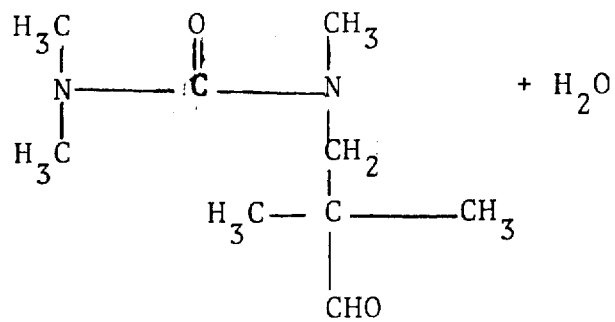

Column 3, line 3, "5,5-dimethyl-oxaheexahydropyrimidine" should read -- 5,5-dimethyl-oxahexahydropyrimidine --. Column 6, line "pyrrolidoneneoptental" should read -- pyrrolidoneneopental --.

Signed and sealed this 1st day of June 1971.

(SEAL)
Attest:

EDWARD M. FLETCHER, JR.
Attesting Officer

WILLIAM E. SCHUYLER, JR.
Commissioner of Patents